Sept. 4, 1956 C. J. KREIGHBAUM 2,761,488
APPARATUS FOR APPLYING CAMEL BACK TO A TIRE CASING
Filed June 25, 1954 2 Sheets-Sheet 1
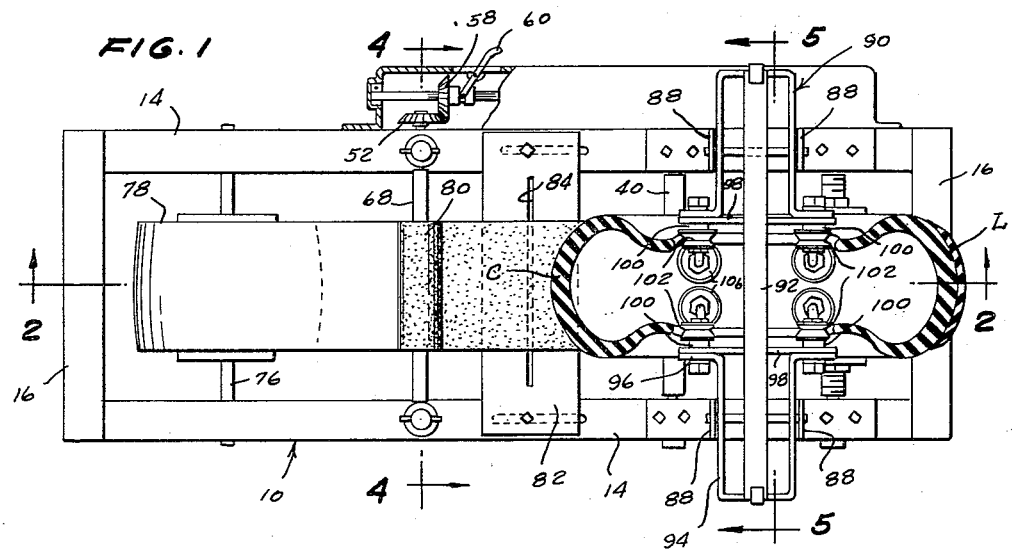
INVENTOR.
CLAUD J. KREIGHBAUM
BY
McMorrow, Berman + Davidson
ATTORNEYS.

Sept. 4, 1956   C. J. KREIGHBAUM   2,761,488
APPARATUS FOR APPLYING CAMEL BACK TO A TIRE CASING
Filed June 25, 1954   2 Sheets-Sheet 2
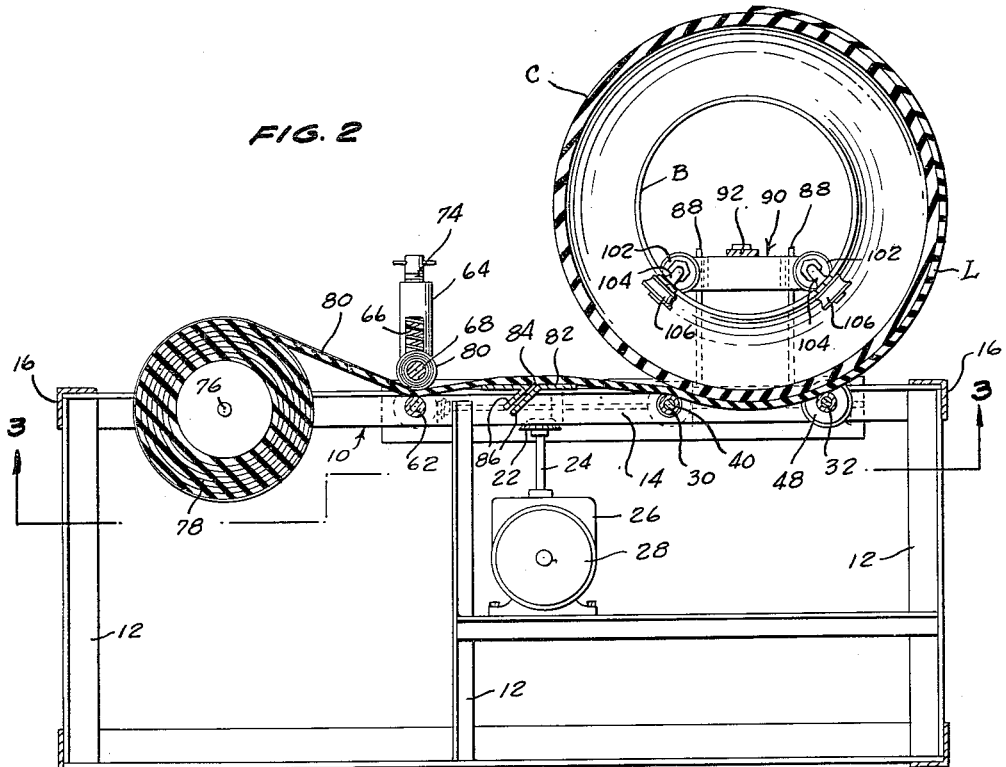
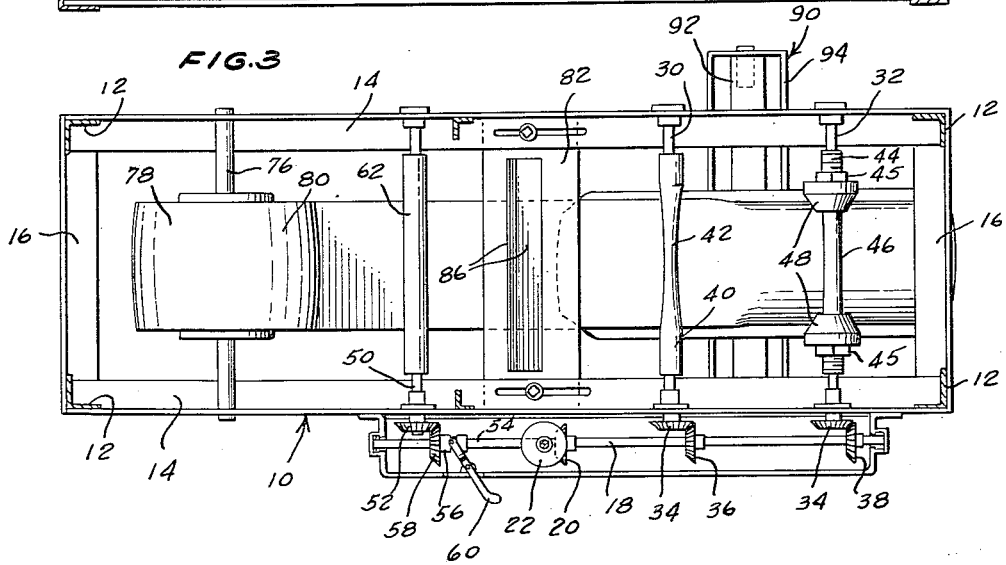
INVENTOR.
CLAUD J. KREIGHBAUM
BY
McMorrow, Berman + Davidson
ATTORNEYS United States Patent Office 2,761,488
Patented Sept. 4, 1956

2,761,488

APPARATUS FOR APPLYING CAMEL BACK TO A TIRE CASING

Claud J. Kreighbaum, North Sacramento, Calif.

Application June 25, 1954, Serial No. 439,255

3 Claims. (Cl. 154—9)

This invention relates to apparatus for applying camel back to a tire casing and has for its primary object to avoid the stretching of the camel back during the application thereof to the tire casing and thus eliminate thin spots in the tire tread due to the stretching thereof over the casing.

Another object is to roll onto the tire casing the adhesively coated side of a length of camel back without effecting a stretching thereof.

A still further object is to spread the tire casing during the initial application of the camel back thereto so as to flatten the periphery of the tire casing at the instance of contact of the tire casing with the adhesive coating of the camel back.

Still another object is to sever from a supply of camel back a length thereof sufficient to encircle a tire casing and to effect the cutting of the camel back at an angle of approximately 45° in order to facilitate the making of the splice therein.

The above and other objects may be attained by employing this invention which embodies among its features driven rolls mounted to rotate in unison about spaced parallel horizontal axes, means mounted adjacent the driven rolls for feeding an adhesively coated length of camel back thereacross, and means mounted above the driven rolls for engaging a tire casing and holding the periphery thereof in rolling contact with the adhesive coating on the length of camel back for causing the length of camel back to adhere to the tire casing.

Other features include a supply of adhesively coated camel back mounted in spaced relation to the driven rolls, feed rolls mounted between the driven rolls and the supply of camel back and engaging a length of the camel back as it leaves the supply thereof for feeding said length of camel back across the driven rolls, means mounted between the driven rolls and the feeding means for engaging the camel back and severing it at a selected distance from the driven rolls, guide rolls mounted above the driven rolls and engaging the beads of a tire casing for holding the periphery thereof in rolling contact with the adhesive coating on the length of camel back for causing the length of camel back to adhere to the tire casing, and spreader rolls carried by the guide rolls and engaging the interior of the tire adjacent the beads thereof for moving said beads outwardly as they engage the guide rolls.

In the drawings:

Figure 1 is a top plan view of a machine for applying camel back to a tire casing showing the tire casing in position thereon and in section;

Figure 2 is a longitudinal sectional view taken substantially on the line 2—2 of Figure 1;

Figure 3 is a bottom plan view of the machine, taken substantially on the line 3—3 of Figure 2;

Figure 4 is a vertical sectional view taken substantially on the line 4—4 of Figure 1; and Figure 5 is a transverse sectional view taken substantially on the line 5—5 of Figure 1.

Referring to the drawings in detail, a frame 10 is supported on suitable legs 12 and comprises spaced parallel side bars 14 connected adjacent opposite ends by end bars 16 to define an open frame or bed for the machine. Carried by the frame 10 and extending in spaced parallel relation with one of the side bars 14 for rotation about an axis which lies parallel to the longitudinal axis of the frame 10 is a drive shaft 18 carrying a drive pinion 20 which has meshing engagement with a beveled pinion 22 mounted on the drive shaft 24 of a speed reduction unit 26 which is driven by a suitable prime mover 28 such as an electric motor.

Mounted in suitable bearings carried by the side bars 14 of the frame 10 are spaced parallel drive shafts 30 and 32, each carrying adjacent one end a drive pinion 34 which has meshing engagement with pinions 36 carried by the shaft 18 so that as the shaft 18 is set into motion, the drive shafts 30 and 32 will be rotated in unison. Carried by the drive shaft 30 for rotation therewith between the side bars 14 of the frame 10 is a drive roll 40 which, as illustrated in Figure 3, is provided intermediate its ends with a relatively shallow gently curved recess 42 which is adapted to guide the camel back in a partially curved condition onto the periphery of the tire casing, as will be more fully hereinafter described. A similar drive roll 46 is mounted on the drive shaft 32 and carries adjacent opposite ends external screw threads 44. Threadedly engaged with the threads 44 adjacent opposite ends thereof are flanges 48 which engage the camel back and shape it around the tire surface as the tire casing is rolled thereon. The flanges 48 are adjusted to selected positions on the roll 46 by rotating them relative to the roll 46 and clamping them in the selected positions by lock nuts 45.

Mounted in bearings carried by the side bars 14 in spaced relation to the drive rolls 40 and 46 is a feed shaft 50 carrying adjacent one end a drive pinion 52, and splined as at 54 on the shaft 18 to move longitudinally relative thereto but to rotate therewith is a clutch collar 56 carrying a drive pinion 58 which is adapted to be moved by the clutch collar 56 into and out of meshing engagement with the pinion 52. A hand lever 60 is carried by the frame 10 and is operatively connected to the clutch collar 56 for moving it longitudinally on the shaft 18, as will be readily understood upon reference to the drawings. A feed roll 62 is carried by the feed shaft 50, and mounted on the side bars 14 and extending upwardly from the frame 10 are tubular standards 64, the adjacent sides of which are provided with vertical slots 66 in which are mounted for vertical sliding movement opposite ends of a pressure roller 68, the axis of which lies in a vertical plane which extends through the axis of the feed roll 62. Compression coiled springs 70 are contained within the tubular standards 64 with their lower ends resting on suitable bearing shoes 72 which bear on the pressure roller 68 adjacent opposite ends thereof, and threadedly entering the upper ends of the tubular standards 64 are screws 74 which engage the upper ends of the springs 70 to urge the bearing shoes 72 downwardly and thus yieldingly urge the pressure roller 68 toward the feed roll 62.

Removably mounted in the side bars 14 of the frame 10 and extending transversely thereacross is a spindle 76 on which is mounted a supply 78 of camel back arranged in convolutions and carrying on one side a coating of adhesive to which is adhesively connected a protective film 80 which serves to prevent the convolutions of camel back from adhering together when in the rolled condition, as shown in the drawings.

Mounted for longitudinal adjustment on the side bars 14 of the table or frame 10 is a table 82 which extends transversely across the frame 10 between the side bars 14 and is provided with an elongated longitudinal slot 84. Spaced parallel guides 86 extend downwardly from the table 82 between the side bars 14 with their adjacent sides aligning with the opposite sides of the slot 84 to define guides for guiding a suitable severing implement or knife by means of which a length of camel back is severed from the supply 78 thereof.

Carried by the side bars 14 and extending upwardly therefrom adjacent the end of the frame 10 remote from the supply of camel back 78 are spaced parallel guides 88 between which is mounted for vertical sliding movement a carriage 90 which extends transversely across the machine and comprises a tie bar 92 carrying adjacent opposite ends substantially U-shaped frame members 94, the legs of which extend inwardly toward the longitudinal axis of the machine and carry adjacent their inner ends outwardly extending feet or flanges 96 to which are secured parallel supporting bars 98 which extend parallel to the bight portions of the U-shaped frames 94 and substantially parallel to the longitudinal axis of the machine. Carried by the feet 96 and extending inwardly therefrom are studs 100 on which are mounted for rotation grooved wheels 102, which are illustrated in Figures 1, 2 and 5, and which engage the beads B of a tire casing C to urge the casing downwardly toward the rolls 40 and 44. Carried by the stud shafts 100 adjacent the opposed ends thereof and extending angularly therefrom are angle brackets 104 on which are mounted for rotation spreader rollers 106, which, as illustrated in the drawings, engage the inner sides of the tire casing C adjacent the beads B to spread the casing open, as illustrated in Figure 1, to not only flatten the tread portion of the casing but also to permit inspection of the interior of the casing.

In use, a supply 78 of camel back consisting of a strip thereof rolled in successive convolutions and having an adhesive coating on one side is provided with a protective film 80 which extends over the adhesive coating to prevent successive convolutions of the strip of camel back from cementing together, is supported on the shaft 76. The outer end of the strip of camel back is fed off of the roll and threaded between the feed roll 62 and pressure roller 68 and the protective film 80 is stripped from the strip of camel back and rolled about the roller 68, as suggested in Figure 2, so that the length of camel back passing beyond the feed roll 62 and pressure roller 68 will have its adhesive surface exposed for contact with the casing C. The length of camel back thus prepared is passed across the driven rolls 40 and 46 with the tire casing C pressed into contact with the camel back by the carriage 90 through the engagement of the guide wheels 102 with the beads of the tire casing C. As the drive rolls 40 and 46 rotate, the camel back will be fed from the supply 78 thereof across the table 82 and when a length sufficient to encircle the tire casing C has been removed from the supply 78, a knife or other severing instrument is passed through the slot 84 and between the guides 86 to separate the length L of camel back from the supply so that when the tire casing C has made a complete revolution, the adjacent ends of the camel back will lie in contact and due to the angular cut guided by the members 86 will form a splice in the outer surface of the tire. Owing to the concave shape of the roll 40, and the disks 48 on the driven roll 46, the camel back will be curved transversely as it is laid on the tire casing C so as to conform to the curvature of the convex side thereof. By thus applying the camel back to the casing C, no stretching of the camel back takes place and consequently thin spots therein are eliminated so that upon vulcanization of the length L of camel back to the tire casing C, a perfect tread surface will be produced which will preserve the balance of the tire and avoid the production of thin spots which are subject to rapid wear.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. Apparatus for applying camel back to a tire casing comprising driven rolls mounted to rotate in unison about spaced parallel horizontal axes, a supply of adhesively coated camel back mounted in spaced relation to the driven rolls, feed rolls mounted between the driven rolls and the supply of camel back and engaging a length of the camel back as it leaves the supply thereof for feeding said length of camel back across the tops of the driven rolls, guide rolls mounted above the driven rolls for engaging the inner periphery of a tire casing and holding the outer periphery thereof in rolling contact with the adhesive coating on the length of camel back for causing the length of camel back to adhere to the tire casing, spreaders carried by the guide rolls and engaging the interior of the tire adjacent the beads thereof for moving said beads outwardly as they engage the guide rolls, and means mounted between the driven rolls and the feed rolls for engaging the camel back and severing from the supply thereof a length sufficient to encircle the periphery of the tire casing.

2. Apparatus for applying camel back to a tire casing comprising driven rolls mounted to rotate in unison about spaced parallel horizontal axes, means mounted adjacent the driven rolls for feeding an adhesively coated length of camel back across the tops thereof, guide rolls mounted above the driven rolls and engaging the beads of a tire casing for holding the outer periphery thereof in rolling contact with the adhesive coating on the length of camel back and causing the length of camel back to adhere to the tire casing, and spreaders carried by the guide rolls and engaging the interior of the tire adjacent the beads thereof for moving said beads outwardly as they engage the guide rolls.

3. Apparatus for applying camel back to a tire casing comprising driven rolls mounted to rotate in unison about spaced parallel horizontal axes, means mounted adjacent the driven rolls for feeding an adhesively coated length of camel back across the tops thereof, a carriage removably mounted above the driven rolls for movement in a vertical path between said rolls, grooved guide rolls carried by the carriage and extending outwardly therefrom for movement therewith in vertical paths directly above the driven rolls, said guide rolls engaging the beads of a tire casing and holding the periphery thereof in rolling contact with the adhesive coating on the length of camel back to cause the length of camel back to adhere to the tire casing, and spreader rolls carried by the carriage adjacent the guide rolls for spreading the tire casing and flattening the periphery thereof as it engages the camel back.

References Cited in the file of this patent

UNITED STATES PATENTS

| 2,473,067 | Miller | June 14, 1949 |
| 2,474,511 | Bacon | June 28, 1949 |
| 2,498,953 | Glynn | Feb. 28, 1950 |
| 2,522,819 | Glynn | Sept. 19, 1950 |
| 2,556,264 | Flynn | June 12, 1951 |